United States Patent [19]
Kasper et al.

[11] 3,757,074
[45] Sept. 4, 1973

[54] SYSTEM FOR CONTROLLING RELATIVE DISPLACEMENT BETWEEN WORKPIECES AND AN INDUCTOR

[75] Inventors: Robert J. Kasper, Seven Hills; William H. Killian, Parma Heights, both of Ohio

[73] Assignee: Park-Ohio Industries, Inc., Cleveland, Ohio

[22] Filed: Apr. 28, 1972

[21] Appl. No.: 248,423

[52] U.S. Cl. ............................ 219/10.77, 219/10.73
[51] Int. Cl. ............................................. H05b 1/02
[58] Field of Search ..................... 219/10.77, 10.75, 219/109, 110, 10.73; 323/20

[56] References Cited
UNITED STATES PATENTS

| | | | |
|---|---|---|---|
| 2,510,770 | 6/1950 | Bohn | 219/10.77 X |
| 3,240,961 | 3/1966 | Noth | 219/110 X |
| 3,373,330 | 3/1968 | O'Brien | 323/20 X |
| 3,601,571 | 8/1971 | Curcio | 219/10.77 X |
| 2,971,754 | 2/1961 | Seyfried | 219/10.77 X |
| 3,389,239 | 6/1968 | Treppa et al. | 219/110 |

*Primary Examiner*—J. V. Truhe
*Assistant Examiner*—B. A. Reynolds
*Attorney*—James H. Tilberry, Alfred C. Body and Robert V. Vickers

[57] ABSTRACT

A system is disclosed for controlling the intermittent feeding of workpieces in magnetically coupled relationship with respect to an induction heating coil. A pusher mechanism is provided and is reciprocated intermittently to push a workpiece to be heated into one end of the coil and to displace workpieces in the coil so that the workpiece adjacent the other end thereof is discharged. Intermittent reciprocating movement of the pusher mechanism is controlled by an electric signal representative of the energy input to the workpieces, and which signal is derived by creating a power signal representative of the instantaneous power supplied to a workpiece and integrating the power signal with respect to time. When the energy input signal reaches a preselected value the pusher mechanism is actuated and the time integrating portion of the control circuitry is interrupted and reset. The power signal is then again integrated with respect of time to create another energy signal for subsequently actuating the pusher mechanism.

10 Claims, 1 Drawing Figure

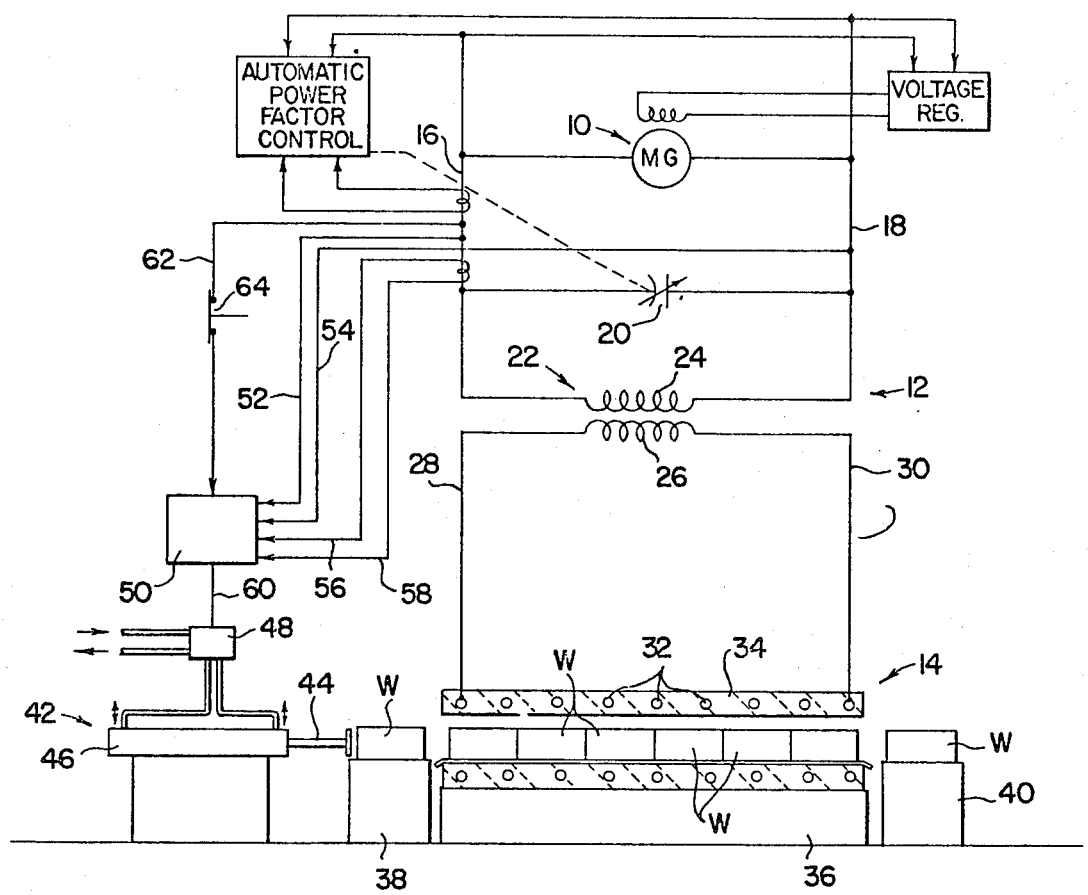

SYSTEM FOR CONTROLLING RELATIVE DISPLACEMENT BETWEEN WORKPIECES AND AN INDUCTOR

The present invention relates to the art of induction heating and, more particularly, to a system for controlling the relative displacement between workpieces and an inductor in magnetically coupled relationship with respect thereto.

While the present invention finds particular utility and will be described in conjunction with the progressive induction heating of a plurality of metal workpieces as the latter are intermittently advanced relative to a fixed inductor, it will be appreciated that the principles of the invention have a much broader application and are applicable in general to any progressive induction heating operation wherein there is a relative displacement between an inductor and workpiece or workpieces.

Induction heating apparatus has been provided heretofore for the purpose of progressively heating a plurality of workpieces such as billets for forgings as the workpieces are intermittently advanced in magnetically coupled relationship with respect to an inductor of the apparatus. Generally, the apparatus includes a work feed mechanism which is intermittently actuated to move a cold workpiece into magnetically coupled relationship with respect to one end of the inductor and to move the workpieces ahead of the cold workpiece toward the other end of the inductor, whereby a heated workpiece is discharged from the inductor each time a cold workpiece is introduced for heating. When the inductor is fully loaded with workpieces, and the thermal conditions of the inductor have reached a state of equilibrium, the workpieces are advanced relative to the inductor at a uniform periodic rate so that the workpieces discharged from the inductor are generally uniformly heated to the extent desired.

While workpieces heated in the above manner generally are acceptable once uniform thermal conditions are reached, uncontrollable conditions are encountered during apparatus operation which often result in workpieces being underheated or overheated. In this respect, the workpieces are advanced by the feed mechanism at preset timed intervals. Thus, a variation in the voltage level of the power source for the inductor upwardly or downwardly from a preselected level will result, respectively, in overheating and underheating of workpieces being advanced relative to the inductor during such variation. Likewise, variations in the size of workpieces being heated from a nominal size used as a basis for determining operating parameters of the apparatus results in overheating or underheating, respectively, of an under size and over size workpiece. The actual dimensions of individual workpieces having the same nominal dimensions can vary considerably, especially if the workpieces are billets for forging. While the level of supply voltage to the inductor can be adjusted such as by the manipulation of manual dials, it will be appreciated that it would be practically impossible, even for the most experienced operator, to successfully adjust the power level and feed rate under such varying operating conditions to avoid overheating or underheating problems. Special voltage control equipment can be employed, but this is expensive and serves only to maintain power supply voltage at a constant level, whereby indexing control is still necessary. Further, variations in the operation of indexing timers employed can vary the workpiece heating.

In addition to the problems encountered during operation of the induction heating apparatus under stabilized thermal conditions, including the problems discussed above, there are further and more serious problems encountered in and attendant to starting up of the apparatus such as at the beginning of a workday. The latter problems result in a considerable reduction of operating efficiency and loss of production time and workpieces. In this respect, the inductor of the apparatus is cold. Presuming there are no workpieces positioned for magnetic coupling with the inductor, one or more workpieces are so positioned relative to the input end thereof and the inductor is energized and the feed mechanism operated to achieve intermittent advancement of the workpieces relative to the inductor. Since the inductor is not fully loaded, a low power is drawn by the inductor when the inductor is energized at the rated voltage. Thus, the feed mechanism has to be controlled to decrease the rate of indexing or advancement of workpieces in an effort to avoid underheating of the workpieces. As the apparatus warms up, the indexing rate must be increased to prevent overheating of workpieces, and the indexing adjustment must be continued until such time as thermal conditions of the inductor stabilize. The time required to reach the latter condition often exceeds considerably the time required to fully load the inductor with workpieces between the input and discharge ends thereof.

Varying of the feed rate during the warm-up period may be achieved by an operator manually controlling actuation of the feed mechanism. Any degree of accuracy obtained in changing the feed rate in this manner, however, can be attributed primarily to the operators experience because he bases his manual actuation of the feed mechanism on his observation of continually varying conditions of the apparatus and workpieces as they are progressively heated. It will be appreciated therefore that the adjustment procedure is largely guesswork. Further, when the inductor becomes substantially or fully loaded with workpieces before thermal conditions stabilize, it may be necessary in addition to feed control, to reduce the level of supply voltage to the inductor to avoid drawing excess current. This adjustment may also be manual and if so, is performed by the operator in response to observed conditions. The foregoing conditions vary continuously during inductor warm-up and it has been found from previous experience that even the most skilled and experienced operator can not make the necessary adjustments with the degree of accuracy required to prevent substantial loss of workpieces due to over or underheating. Thus, production time is lost and the efficiency of the induction heating process is reduced. Other efforts to avoid the foregoing problems following loading of the inductor with workpieces include the use of temperature sensing devices operable to control indexing of the feed mechanism in accordance with the sensed temperature of a heated workpiece at the discharge end of the inductor. While such devices may provide for achieving better results than are achieved by manual adjustments made by an operator, it remains that less than desirable results are achieved. In this respect, changes in the indexing rate are based on the sensed temperature of a given workpiece at the discharge end of the inductor. If the voltage level varies from the rated or adjusted level the changes dictated by the temperature of the latter can result in under or overheating of workpieces in the inductor.

In view of the foregoing and other disadvantages and difficulties attendant to the start-up and subsequent operation of induction heating apparatus for the progressive heating of workpieces it will be appreciated that there is a need for a system for more accurately controlling the indexing rate of workpieces. This need is fulfilled by the present invention which provides for the feed mechanism of the apparatus to be actuated by an electrical signal representative of a desired energy input to a workpiece magnetically coupled with the inductor. This provides for the feed mechanism to be cycled during start-up and subsequent operation of the apparatus in accordance with the actual energy applied to the workpieces. Thus, during start-up a minimum number of underheated parts are discharged from the apparatus in a minimum amount of time and during operation after thermal conditions have stabilized a minimum number of underheated workpieces are discharged.

More particularly, in accordance with the present invention, the inductor of the apparatus is connected to a power supply and a system is provided for creating a power signal which is representative of the instantaneous power supplied to a workpiece magnetically coupled with respect to the inductor. The power signal is continuously integrated with respect to time to create an energy signal representative of energy input to the workpiece. When the energy signal reaches a preselected value it actuates the workpiece feed means such as a pusher mechanism to move a cold workpiece into magnetically coupled relationship with respect to the inductor and to advance workpieces ahead of the cold workpiece toward the discharge end of the inductor. By integrating the power signal with respect to time the energy applied to a given workpiece can be determined, and when the energy reaches the preselected level the workpiece feed mechanism is actuated regardless of the time required for the signal to reach the preselected level. Thus, at each indexing of the workpieces there is a given energy input to the inductor so that each workpiece in moving through the inductor receives the same total energy input. Any parameter changes during start-up or subsequent operation of the apparatus are compensated for by changes in the time required for the energy signal to reach the preselected level. This provides an extremely accurate method for controlling the actuation of the workpiece feed mechanism and thus advantageously reduces the number of underheated or overheated workpieces to a minimum. During start up and shut down operations automatic power factor control and voltage regulation is employed to limit current in the inductor.

An object of the present invention is the provision of a system for controlling the intermittent feeding of workpieces to be progressively heated relative to an inductor of an induction heating installation to minimize the loss of production time and workpieces.

Another object of the present invention is the provision of a system for controlling the intermittent feeding of workpieces relative to an inductor of an induction heating installation in accordance with the energy input to a workpiece being heated.

Yet another object of the present invention is the provision of a system for controlling the intermittent feeding of workpieces relative to the inductor of an induction heating installation in accordance with an electrical signal derived by generating a signal corresponding to the power supplied to a workpiece and integrating the power signal with respect to time.

A further object of the present invention is the provision of a system of the foregoing character which provides for the workpiece feed mechanism to be intermittently actuated and controlled in accordance with the actual energy input to a workpiece being inductively heated.

The foregoing objects, and others, will in part be obvious and in part more fully pointed out hereinafter in conjunction with the description of the accompanying drawing depicting a preferred embodiment of the present invention.

Referring now in greater detail to the drawing wherein the showings are for the purpose of illustrating a preferred embodiment of the invention only and not for the purpose of limiting the same, an induction heating installation is illustrated which includes a power supply 10, output circuit 12 and inductor 14 for inductively heating workpieces W. In the embodiment illustrated, power supply 10 is a motor generator set, and output circuit 12 includes leads 16 and 18 and variable capacitor 20 connected thereacross for automatically adjusting the power factor of the power supply output. The output circuit further includes a coupling transformer 22 having a primary winding 24 and a secondary winding 26. Secondary winding 26 is connected to leads 28 and 30 which are connected to opposite ends of inductor 14. Inductor 14 may take any one of a variety of forms and, in the embodiment illustrated, is in the form of a solenoidal coil comprised of a plurality of convolutions 32 embedded in suitable insulating refractory material 34. In a manner well known, the inductor is produced from tubular non-magnetic conducting material such as copper and the tubular structure provides for a cooling fluid such as water to be circulated through the inductor to cool the latter.

Inductor 14 is suitably supported relative to a floor or the like by an underlying support 36, and workpiece support components 38 and 40 are provided adjacent opposite ends of the inductor. Support component 38 is disposed adjacent the input end of inductor 14 and is adapted to support a cold workpiece to be heated, and support component 40 is disposed adjacent the output end of inductor 14 so as to receive a heated workpiece upon discharge thereof from induction heating relationship with inductor 14. It will be appreciated that suitable means, not illustrated, are provided in conjunction with support component 38 to deliver workpieces to be heated into a position for the workpiece to be moved into magnetically coupled relationship with inductor 14 at the inlet end of the inductor, and that means will be provided in association with support component 40 to convey discharged heated workpieces away from the inductor.

A pusher mechanism 42 is supported adjacent the inlet and of inductor 14 and is operable to displace a workpiece from support component 38 and into the inlet end of the inductor, whereby the workpieces in the inductor are advanced toward the discharge end thereof and the workpiece adjacent the discharge end is displaced onto support component 40. In the embodiment illustrated, the workpiece feed mechanism comprises a reciprocable pusher member 44 in the form of a reciprocable shaft or piston rod component of a hydrualic or pneumatic motor having a cylinder 46 in which a piston member, not illustrated, is reciprocated in response to the flow of control fluid into and out of the cylinder. The flow of fluid relative to cylinder 46 is controlled by a valve 48 interposed between a control fluid source, not illustrated, and cylinder 46. Valve 48 is electrically actuable and may, for example, be relay controlled. The valve has two modes of operation. In one of the modes of operation the valve is operable to control fluid flow to cylinder 46 in a manner whereby pusher member 44 moves outwardly of cylinder 46 towards inductor 14. In the other mode of operation, valve 48 controls the fluid flow in a manner whereby pusher member 44 is retracted relative to cylinder 46. It will be appreciated that the valve will operate in one of the modes when electrically actuated and in the other of the modes when unactuated. The particular structures of the valve and fluid motor are not pertinent to the present invention, and it will be appreciated that a number of suitable motor and valve arrangements could be provided to achieve the desired reciprocating movement for workpiece stepping. Moreover, it will be appreciated that feed mechanism defined by devices other than fluid motor assemblies could be employed under the control of an electrically actuated device other than a valve. For example, the reciprocating feed mechanism could be electrically driven such as by a motor under the control of an electrically actuated switch, or various combinations of electric and fluid devices could be employed to achieve workpiece feed control.

In the progressive heating of a plurality of workpieces by an inductor such as inductor 14, it is desirable to control the intermittent feeding of workpieces to the inductor in a manner whereby the heating of workpieces relative to one another upon discharge from the inductor is uniform. The difficulty in achieving desired heating of workpieces is realized during the start-up operation of an induction heating installation when the inductor is cold and is either empty or filled with cold workpieces, whereby a considerable number of underheated or overheated workpieces are discharged from the inductor during the start-up operation. In accordance with the present invention, however, the number of under or overheated parts is advantageously reduced to a minimum by providing for the workpiece feed mechanism to advance workpieces relative to the inductor in accordance with the energy input to the workpieces. Thus, the advancement of workpieces relative to the inductor is automatically controlled in accordance with an extremely accurate measurement of the extent of workpiece heating thus to eliminate the guess work heretofore required with regard to varying the intervals between advancements of workpieces during a start-up operation. Further, in accordance with the present invention, over or underheating of workpieces during operation of the apparatus subsequent to start-up heretofore resulting from variations in the power supply voltage are substantially reduced. The end result is a minimizing of lost production time and workpiece wastage during and following start up and during shut down.

The desired workpiece feeding is achieved in accordance with the present invention by means of a control device 50 which is operable to control actuation of valve 48 from one mode of operation thereof to the other in accordance with measured energy input to a workpiece or workpieces disposed in magnetically coupled relationship with inductor 14. Control device 50 may take the form illustrated in the copending application of George D. Pfaffman, Ser. No. 185,316, filed Sept. 30, 1971 and assigned to the assignee of the present application, and the disclosure of the latter application is incorporated herein by reference. Briefly, control device 50 is comprised of electronic components including means to sense the voltage across primary winding 24 of transformer 22 and means to sense the current in the primary circuit. More particularly, control device 50 includes a pair of voltage sensing leads 52 and 54 connected across primary winding 24 and a pair of current sensing leads 56 and 58 inductively coupled with lead 16 of primary winding 24. The sensed voltage and current are coupled to a transducer (not illustrated) which provides an output signal representative of the instantaneous power supplied to a workpiece or plurality of workpieces which are then magnetically coupled with inductor 14. This proportional output signal is connected to the input of control devices 50. Control device 50 further includes a circuit for continuously integrating the power signal with respect to time to create a signal which is representative of the energy input per workpiece to the workpiece or workpieces. The magnitude of the energy input signal varies in accordance with time and at any given time has a magnitude corresponding to the energy input per workpiece to the workpiece or workpieces at that given time. Further, an electric relay is connected to electrically actuated valve 48 through a lead 60. By providing for this relay to be actuated in response to the energy input signal reaching a preselected value corresponding to a predetermined energy input per workpiece, the workpiece feed mechanism will be actuated each time the energy input per workpiece reaches the preselected value. The desired energy input per workpiece, and accordingly the level of the energy input signal at which the signal performs its control function, is determined by the total energy input to a workpiece required to achieve the desired heating thereof during its movement through the coil. Thus, if five indexing steps are required to move the workpiece through the coil, the level of the energy input signal to cause indexing would be one fifth of the total energy input required for the workpiece to be discharged in the desired heated condition.

Since the power signal is integrated with respect to time, changes or variations in the power supply voltate from a desired level during and subsequent to the start-up operation are compensated for by the control device so that the feed mechanism is actuated only when the energy input per workpiece reaches the preselected level and regardless of the time required for the signal to reach that level. Thus, presuming inductor 14 to be empty at the beginning of the start-up operation, one or two workpieces will be introduced into the input end of the inductor and, since the load resistance is high, the inductor will draw low power when started at rated voltage and unity power factor. The cycle time for actuation of the feed mechanism will therefore be longer than if the inductor were operating under stabilized thermal conditions. The power level is increased as the inductor becomes loaded, whereby less time is required for the energy signal to reach the preselected value. Accordingly, the cycle time of the feed mechanism increases. Advantageously, the regulation of the power supply voltage level during start-up does not have to be achieved with a high degree of accuracy. In this respect, regardless of the variation in voltage from a given level, the power signal is integrated with respect to time, whereby the voltage variations are compensated for. Thus, the control device functions to cause actuation of the feed mechanism only when the energy input reaches the preselected value per workpiece for the workpieces being heated.

It will be appreciated, of course, that the time integrating circuitry of the control device must be reset following actuation of the feed mechanism to provide for the subsequent time integration of the power signal necessary to produce another energy input signal for again actuating the feed mechanism. Such a resetting function can be achieved in any desired manner and, for example, a reset control lead 62 may be connected to the integrating circuitry from power source lead 16 through a switch 64 adapted to be momentarily opened to reset the integrating circuit upon actuation of the feed mechanism. It will be appreciated that the momentary opening of switch 64 can be achieved in any desired manner and could, for example, be achieved by physically associating the switch with the feed mechanism so that the switch is momentarily opened upon movement of the feed mechanism in the workpiece feeding direction.

When the electrical and temperature conditions of the induction heating apparatus become stabilized, the control device advantageously operates to provide for the progressive heating of the workpieces to be achieved in a manner whereby succeeding discharged workpieces are more uniformly heated relative to one another than heretofore possible. In this respect, any changes in operating parameters of the power supply system such as a momentary increase or decrease in the power input is compensated for by the time integrating circuitry, whereby the desired energy input per workpiece remains the same regardless of such variations.

Control device 50 can also be employed to advantage during unloading of inductor 14 such as when it is desired to shut down the apparatus. In this respect, ceramic or brick slugs can be introduced into the input end of the inductor in place of cold workpieces until such time as all of the workpieces in the inductor have been discharged from the opposite end thereof. During such unloading, the load resistance progressively increases and the control device operates to increase the cycle time of the feed mechanism so that the workpieces continue to be discharged from the inductor properly heated in accordance with the total energy input required per workpiece. During such unloading, the voltage output of the power source may be regulated and the power factor controlled in accordance with the decrease in load reactance and the variations of these parameters do not have to be extremely accurate since the control device functions to integrate the power input signal in accordance with time to derive the desired control signal for the feed apparatus.

With regard to regulation of the power supply voltage it will be appreciated the voltage level will have to be adjusted under certain circumstances such as, for example, if the apparatus is to be started up loaded with cold workpieces left therein from a previous operation. Accordingly, voltage regulator means, not illustrated in the drawing, may be associated with the motor generator set for this purpose. Further, such voltage regulating means can be automatic and responsive to a condition such as the temperature of workpieces discharged from the inductor so as to maintain the supply voltage within desired limits in response to a sensed condition. As mentioned hereinabove, the accuracy of such regulation is not critical to the workpiece feeding control.

While the inductor is described in the foregoing embodiment as being a solenoidal coil, it will be appreciated that the inductor can be of other forms. Moreover, it will be appreciated that power supplies other than the motor-generator power supply illustrated can be employed. Still further, it will be appreciated that the present invention is applicable to the intermittent advancing of a continuous workpiece relative to an inductor or to the heating of a continuous workpiece by a scanning movement of the inductor relative thereto.

We claim:

1. In an induction heating installation including an inductor, a power supply and an output circuit connecting the inductor to the power supply, a system for controlling intermittent movement between the inductor and a workpiece in magnetically coupled relationship therewith, said system including means for producing a power signal representative of the power input to the workpiece from the inductor, means for integrating said power signal with respect to time to produce a signal representative of energy input to said workpiece, means for displacing one of said workpiece and inductor relative to the other, and means controlled by said energy input signal to actuate said displacing means when said energy input signal reaches a preselected value.

2. The system according to claim 1, wherein said inductor is fixed and said workpiece is displacable in a given direction relative thereto.

3. The system according to claim 2, wherein said inductor has a length in said direction and said displacing means is operable to displace said workpiece a distance less than said length.

4. The system according to claim 1, wherein said inductor is fixed and said workpiece is displacable in a given direction relative thereto, said inductor having a length in said direction and said workpiece having a length in said direction less than the length of said inductor.

5. The system according to claim 4, wherein said inductor is a helical coil and said displacing means is operable to move said workpiece axially with respect to said coil.

6. The system according to claim 5, wherein said displacing means has a displacement in the axial direction generally equal to the length of said workpiece.

7. An inductive heating system comprising an induction heating coil adapted to receive a plurality of workpieces to be heated, a power supply, an output circuit connecting said coil across said power supply, means to intermittently index said workpieces relative to said coil in a direction from one end thereof toward the other for said workpieces to be progressively heated during movement through said coil, means to produce a power signal representative of the power input per workpiece to said workpieces, means to integrate said power signal with respect to time to produce an energy signal representative of energy input per workpiece, and means controlled by said energy signal to actuate said indexing means when said energy signal reaches a predetermined value.

8. The system according to claim 7, and means responsive to actuation of said indexing means to reset said integrating means.

9. An induction heating system comprising an inductor having opposite ends, a power supply, an output circuit connecting the opposite ends of said inductor across said power supply, means to intermittently feed workpieces relative to said inductor from one end thereof toward the other for workpieces to be in magnetically coupled relationship with said inductor, means to produce a power signal representative of the power supplied to a workpiece magnetically coupled with said inductor, means for integrating said power signal with respect to time to create an energy signal representative of energy input to said workpiece, means controlled by said energy input signal to actuate said feed means when said energy signal reaches a preselected value to displace said workpiece toward said other end of said inductor, and means to reset said integrating means in response to actuation of said feed means.

10. The system according to claim 7, wherein said workpieces each have a length in the direction of displacement less than the distance between said opposite ends, and said feed means is operable to displace said workpiece a distance corresponding generally to the length thereof.

* * * * *